W. MONTGOMERY.
Animal-Poke.
No. 219,969. Patented Sept. 23, 1879.
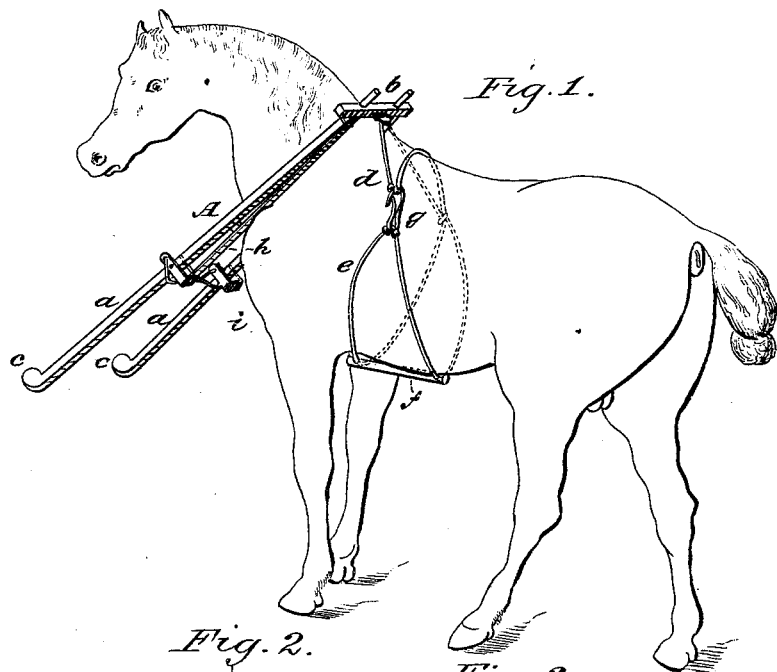
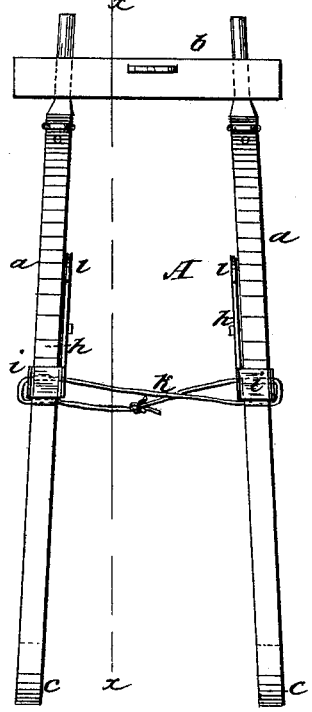
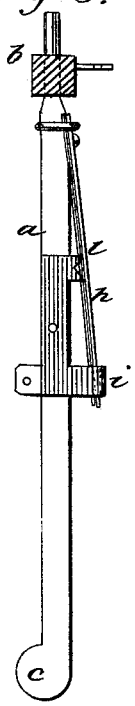
WITNESSES:
INVENTOR:
W. Montgomery
BY
ATTORNEYS.

UNITED STATES PATENT OFFICE.

WILLIAM MONTGOMERY, OF AMITY, PENNSYLVANIA.

IMPROVEMENT IN ANIMAL-POKES.

Specification forming part of Letters Patent No. 219,969, dated September 23, 1879; application filed July 1, 1879.

*To all whom it may concern:*

Be it known that I, WILLIAM MONTGOMERY, of Amity, in the county of Washington and State of Pennsylvania, have invented a new and Improved Animal-Poke, of which the following is a specification.

This device is for placing upon horses or cattle to prevent the animal from jumping fences or breaking them down; and the invention consists in a yoke adapted for resting upon the neck of the horse and attached by straps passing around the body, whereby the yoke cannot be thrown forward by movements of the head and neck, but may adjust itself to the position of the animal in feeding or lying down. The yoke is also fitted with spurs to prick the shoulders when pressure is caused by an attempt to throw down a fence, and with springs that prevent any pricking action by the weight of the yoke. These features I will describe in connection with the accompanying drawings, wherein—

Figure 1 is a perspective view of the yoke as applied upon a horse. Fig. 2 is a front elevation of the poke. Fig. 3 is a side view in section on the line *x x*, Fig. 2.

Similar letters of reference indicate corresponding parts.

The poke A is made of the two straight wooden bars *a a*, inserted rigidly at one end into a short cross-bar, *b*, whereby they form a yoke spreading outward toward the open end, and adapted for resting upon the shoulders of a horse or other animal. This yoke is to extend forward beyond the horse, and the lower ends of the bars *a* are formed with rounded knobs *c*, which permit the ends to slide readily on the ground when the horse is feeding or lies down.

The yoke is attached to the horse at its upper end by the straps *d e*, which are connected with the bar *b* and pass around the body of the horse. These straps may be made of rope or leather. *d* is connected directly to bar *b* and passes at an inclination backward, while *e* passes directly around the body, crossing the strap *d*, and connected to the same where it crosses, so that it serves to hold the strap *e* in place.

The straps *d e* are connected to a rigid bar or stretcher, *f*, of wood, which rests upon the belly of the animal, and serves to keep the straps apart, and a snap, *g*, or similar device is connected with the straps, so that they may be disconnected and the yoke removed.

At the under side of each bar *a* a flat wooden or metal, or combined wood and metal, spring, *h*, is attached, which springs rest against the shoulders of the animal, and are sufficiently stiff to raise the bars *a* a short distance. This movement is limited by a staple, *i*, attached to each bar around the moving end of the spring, the staples also preventing side movement of the springs.

A rope or strap, *k*, is connected to the staples *i*, and extends from one bar *a* to the other to prevent their spreading.

To each bar *a*, a short distance above the staples *i*, a spur or prick, *l*, is attached, with its points projecting toward the shoulders of the animal, but prevented from contact by the spring *h*.

I prefer to make the staple *i* and spur *l* of each bar *a* of a single piece of sheet metal, cut and bent to the required shape, and attached by pins or screws.

The lower end of the yoke projects forward when it rests upon the horse, so that it prevents near approach to a fence, and any attempt to throw the fence down by pressure upon the yoke will press down the springs *h* and cause the spurs to act. The animal cannot throw the lower end of the yoke over the fence preparatory to jumping, as it rests on the shoulders, and is not moved by the head or neck. The lower end will, however, slide forward readily on the ground when the head is lowered for feeding, and when the animal lies down.

The yoke may be formed of a single piece of wood, bent to shape, instead of two pieces connected by the bar, as shown, and only one end need extend below the shoulder of the animal.

Having thus described my invention, I claim as new and desire to secure by Letters Patent—

The improved animal-poke consisting of the bars *a a* and *b*, connected together and fitted with the straps *d e* and stretcher *f*, for connection of the device to the animal, in the manner substantially as and for the purposes set forth.

WILLIAM MONTGOMERY.

Witnesses:
B. F. MONTGOMERY,
J. C. MCCLENATHAN.